Nov. 24, 1925.  
C. M. DOWERS ET AL  
1,562,745

DIRECTION INDICATOR FOR MOTOR VEHICLES

Filed May 15, 1924  3 Sheets-Sheet 1

INVENTOR  
Chester M. Dowers,  
Marion R. Logan.  
BY  
Albert Dietrich  
ATTORNEY

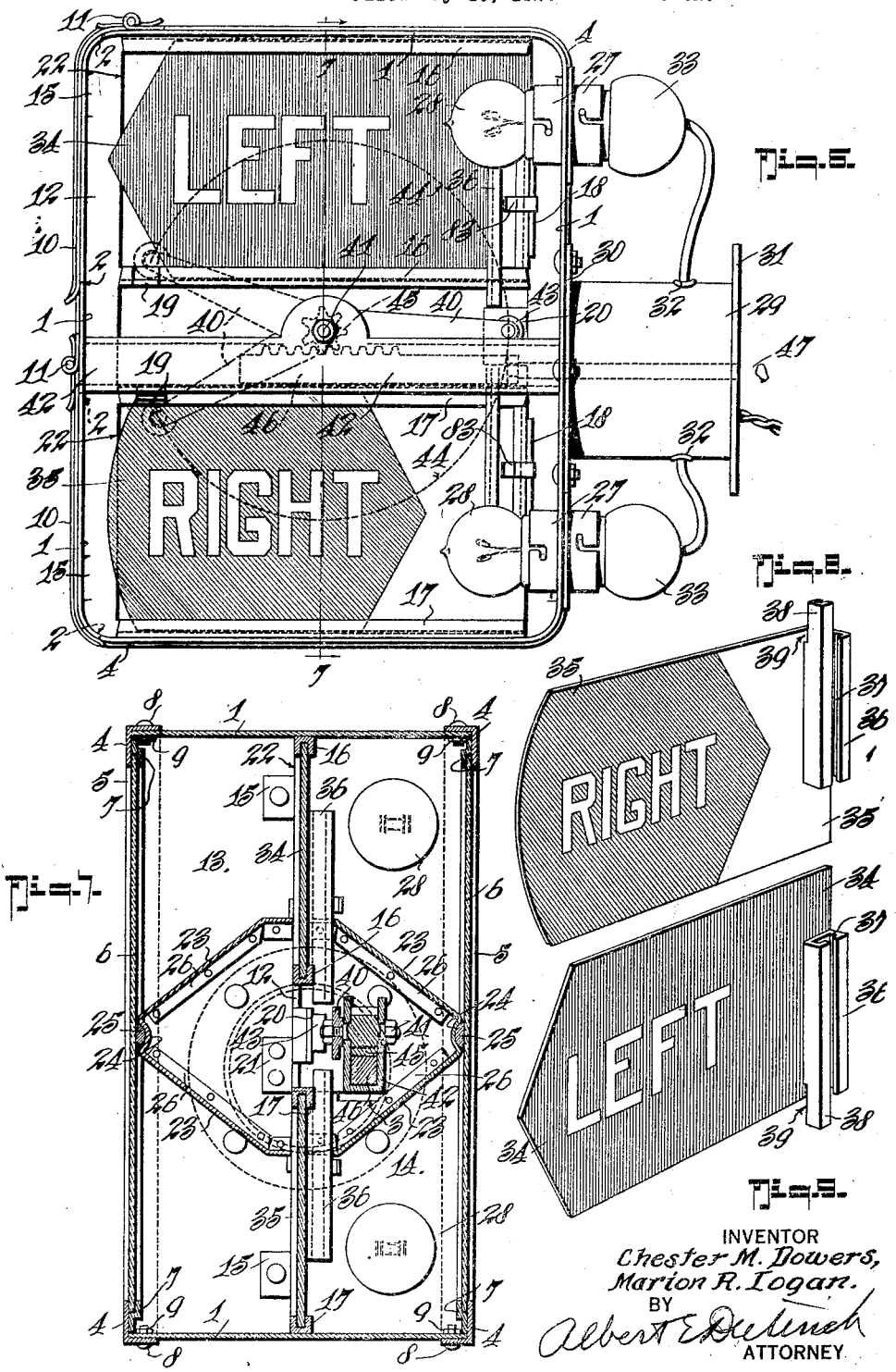

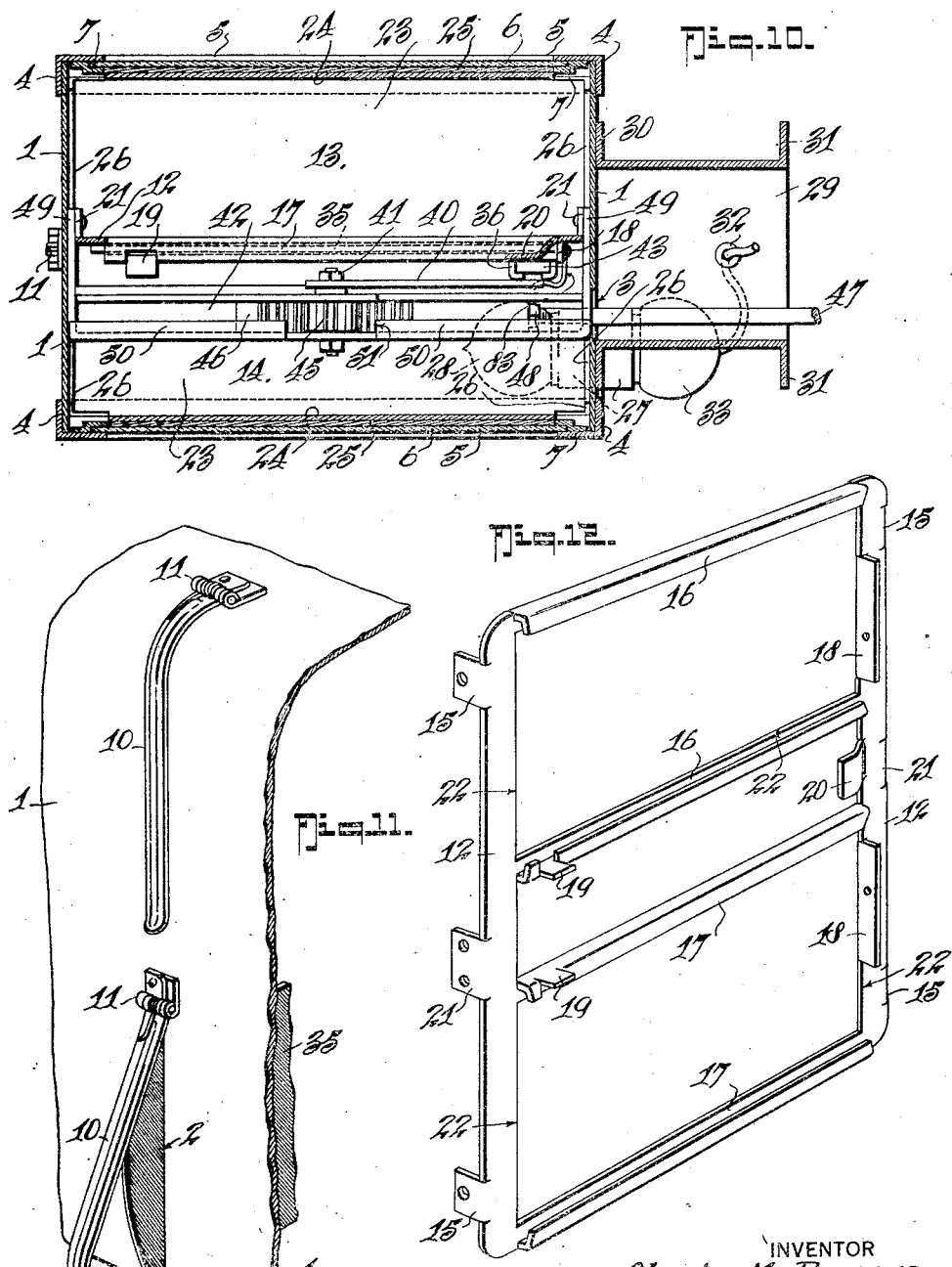

Patented Nov. 24, 1925.

1,562,745

UNITED STATES PATENT OFFICE.

CHESTER M. DOWERS AND MARION R. LOGAN, OF CHEYENNE, WYOMING.

DIRECTION INDICATOR FOR MOTOR VEHICLES.

Application filed May 15, 1924. Serial No. 713,590.

*To all whom it may concern:*

Be it known that we, CHESTER M. DOWERS and MARION R. LOGAN, citizens of the United States, both residing at Cheyenne, in the county of Laramie and State of Wyoming, have invented a new and Improved Direction Indicator for Motor Vehicles, of which the following is a specification.

The invention relates to direction indicators for motor vehicles and has for its general object to provide a simple and inexpensive structure of that type which is simple and positive in its function of indicating the direction a motor operator is about to take either at night or by day.

A great need exists for a practical device as above outlined which is in the nature of an attachment readily mountable upon any conventional make of automobile without great trouble and expense of installation and which will be truly and positively operable. The need referred to is especially felt by drivers of closed cars, in all seasons, and by drivers of all cars in winter, as it is very disagreeable to have to open a window to hand-signal traffic turns.

Therefore, in its more detailed nature, the invention seeks to provide an attachment for motor vehicles which consists of apparatus mountable upon the instrument or dash board of a motor vehicle and adapted to be hand engaged for operating other or signalling apparatus mountable on the outside of the vehicle in cooperative relation therewith and in full view of other vehicular traffic and pedestrians. The signalling apparatus embodies particular features of construction of an advantageous character among which is included the provision of signalling arrows for signalling traffic direction at night and day and lighting devices, the parts being peculiarly arranged and constructed to be practically cooperative and effective in operation in effecting their individual and combined purposes.

With the above and other objects in view, the invention further resides in those novel details of construction, combination and arrangements of parts, all of which will be first fully described, then be particularly pointed out in the appended claims, reference being had to the accompanying drawings, in which:—

Figure 6 is a rear elevation of the indicator body and mechanism with the rear cover removed, the rear light baffle and glass support being also removed for purposes of illustration.

Figure 7 is a vertical cross section taken on the line 7—7 on Figure 6.

Figure 8 is a detail perspective view of the "right" turn indicating arrow.

Figure 9 is a detail perspective view of the "left" turn indicating arrow.

Figure 10 is a central horizontal section of the indicator body and mechanism.

Figure 11 is a fragmentary perspective view showing the spring held yieldable members for covering the arrow slotways.

Figure 12 is a detail perspective view of the partition and arrow guide wall.

Figure 1:
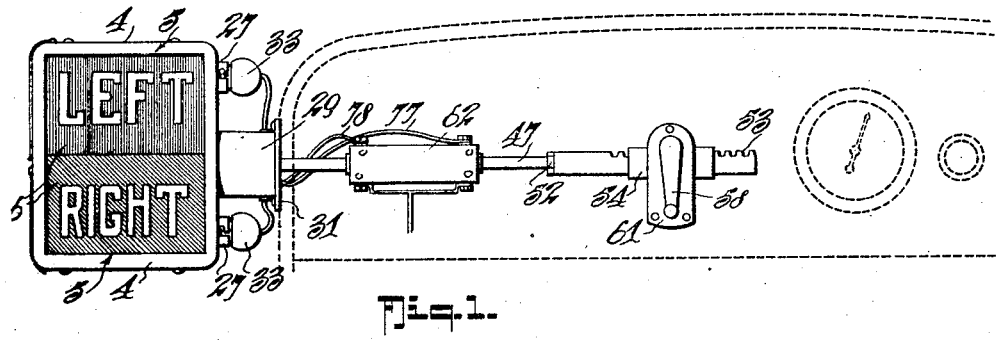
Figure 1 is a diagrammatic elevation showing the application of the invention upon a motor vehicle.

The invention comprises both a mechanical and an electric means for indicating the direction the driver of an auto vehicle is about to take so as to warn drivers of other vehicles behind or before him, or pedestrians, of his contemplated action that they may govern themselves accordingly. A definite cooperation exists between the electrical and mechanical mechanisms of the invention and while it is, of course, unnecessary to use the electrical connections during the day time when the mechanical indicating elements are readily visible, both the electrical and mechanical appliances are utilized in the night time and are so cooperative that both thereof have an indicating function, each cooperative with the other, but still individual to the extent that one does not in any way act in conflict or diminution of the effect of the other. The invention embodies a mechanical control element mounted for convenient reach upon the instrument board of the vehicle, and electric contact means through which the operating element, actuated by the mechanical control, passes for the purpose of actuating the mechanical indicating devices and for simultaneously opening or closing the electric circuits utilized for bringing into action or cutting out of action the electrical indicating devices, and the main body of the invention, which is in the nature of a housing secured to the motor vehicle at one side thereof in position for being viewed by pedestrians and the drivers of auto vehicles, as before stated.

In its detailed nature, in the form of the invention illustrated in the accompanying drawings, 1 represents an open ended rectangular housing or casing body, which includes slot ways 2 for permitting passage therethrough of the indicating elements, and an operating rod passage or aperture 3. End covers 4 are provided which are open faced, as at 5, to acommodate and present to view the glass cover plates 6 held to position upon the end covers 4 by the securing flanges 7. The end covers 4 are secured to position upon the open ends of the casing 1 by machine screws 8 which take through apertures in the said covers 4 and the housing 1 and into receiving socket nuts 9 secured within the housing 1 by soldering or otherwise.

It will be observed by reference to Figure 1 of the drawings, that the glass plates 6 are divided as to color into an upper and lower half, the upper half thereof being suitably marked to indicate "Left" direction, and the lower half thereof being suitably marked to indicate "Right" direction. The portion of the glass which indicates "Left" is red in color and that indicating "Right" is green in color. Obviously, these glass portions may be individual, that is,— be built up of two separate plates or may be included on a single plate specially prepared as to color. It will be also understood by reference to Figures 7 and 10 of the drawings that both the end covers 4 are similarly equipped.

As it is desirous that the slotways 2 be suitably covered to prevent dust and moisture from entering the interior of the housing 1 to effect a rusting or clogging of the parts contained therein, we provide covers for the slotways in the nature of fingers 10, each pivoted by a spring hinge connection 11 at a point above its respective slotway that the said fingers will act to protect the slotway even when one of the indicating elements is acting therethrough, see Figure 11.

The housing 1 is divided, by the partition and arrow guide wall 12, into front and rear compartments designated 13 and 14 respectively. This partition wall is stamped and formed from a single sheet metal blank to include securing ears 15, adapted to facilitate securing of the said partition within the housing 1, upper and lower arrow trackways 16 and 17 for suitably guiding the direction indicating arrows hereinafter referred to in detail, end stops 18 for the arrows, upper and lower roller arm stops 19, a roller guide portion 20, securing feet 21 whereby to facilitate the mounting of a rack bar housing, hereinafter specfically referred to, and suitable openings 22 through which the direction indicating lights may be viewed from the front of the vehicle carrying the invention.

Each of the front and rear compartments 13 and 14 are provided with substantially V-shaped light baffles 23, the converging portions of which are joined to form a bead 24 for accommodating a rubber or felt packer element 25 adapted to tightly engage the respective glass 6 to hold the same against rattling. Each of the baffles 23 is provided with flanges 26 whereby the same may be riveted or otherwise secured to the adjacent walls of the housing 1 in position, as is illustrated clearly in Figure 7 of the drawings, for dividing each front and rear compartment into an upper or "Left" direction indicating compartment and a lower or "Right" direction indicating compartment, the body portions of said baffles serving to prevent confusion and misdirection of the indicating lights when they are used at night time, and for providing therebetween a sort of supplemental casing or housing for the actuating mechanism contained within the housing 1 and hereinafter more specifically referred to. The housing 1 is provided with short sockets 27, the internally projecting portions of which are adapted to accommodate the upper and lower indicating lamps 28, and a suitable spool bracket 29 is provided which has one flange 30 thereof secured by bolt or screw connections to the adjacent wall of the housing 1 and the other flange 31 thereof secured in suitable manner to the adjacent side of the motor vehicle body so as to provide a suitable support for holding the housing upon the motor vehicle and in view of drivers of motor vehicles and pedestrians. Obviously, the flange 31 may be formed at such an angle relative to the body 29 of the bracket as may be necessary to suitably position the housing 1 in proper relation to the surface of the motor vehicle to which it is to be attached. The spool bracket 29 includes suitably insulated holes 32 for accommodating the wires which pass from the socket plugs 33 connected in the externally extended portions of the sockets thereof.

A direction indicating arrow 34 is slidably mounted in the upper guide 16 of the central wall and the said arrow may be colored red and suitably marked to indicate a "Left" turn. Direction indicating arrow 35 is slidably mounted in the lower guide 17 and the said arrow may be colored green and marked to indicate a "Right" turn. The arrow 34 is constructed to have a point portion directed toward the left and the arrow 35 has a similar point marked thereon through the use of the color arrangement to indicate a "Right" direction, each arrow has secured thereto a roller guide 36, each including a roller groove 37 and having an extended portion 38 and being cut away as at 39 to permit movement thereof over the track portions 16 and 17. The extension 38 of the "Left" arrow extends downwardly, and that of the "Right" arrow extends upwardly, in the manner illustrated in Figure 6 of the drawings and for the purpose of being in position for readily receiving the enagaging roller of the operating arm hereinafter specifically referred to.

A single operating arm 40 is so mounted and operable as to be capable of effecting the desired movement, projection and retraction, of the desired direction indicating element or arrow 34 or 35. The operating arm 40 is pivoted at 41 to the trough-like housing 42 which, it will be observed, is of such shape as to permit its being formed up from a single sheet of metal, and is provided with a loose roller 43 at the end thereof, the pivot 41 providing for the swinging of the arm 40 on an arc indicated by the numeral 44, see Figure 6 of the drawings.

For providing for suitable movement of the operating arm 40 on the arc referred to, we provide a small spur gear 45, which is either fixed upon or formed integral with the pivot 41 of the arm and which is adapted to be engaged by the sliding gear rack 46 for being rotated thereby to the three positions indicated by full, dot and dot and dash lines on the said Figure 6.

The gear rack 46 is slidable in the trough of the housing 42 and has an operating arm 47 secured thereto as at 48, the said rod extending through the aperture 3 of the housing 1 and through the spool bracket 29 and electrical control housing mounted upon the instrument board and hereinafter specifically referred to.

As before stated, the housing 42 is of a structure to permit the forming thereof from a single sheet of metal to comprise the main trough-like portion thereof, and extensions 49 adapted to be secured to the ears 21 of the wall 12 to support the said housing, and a top turned-over flange 50, for preventing any tendency toward upward movement of the rack gear 46, the said flange 50 being cut out as at 51 to accommodate the positioning of the gear 45.

Figures 3, 4:
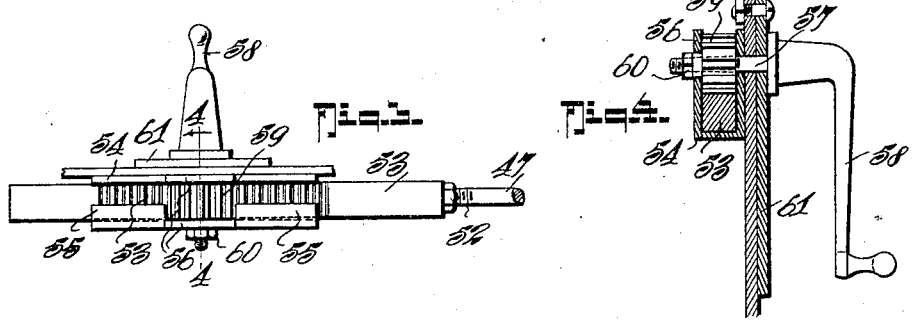
Figure 3 is a plan view of the crank control mechanism.
Figure 4 is a detail cross section taken on the line 4—4 on Figure 3.

The operating rod 47 extends through the aperture 3 and spool bracket 29, as above stated, and through the body of the motor vehicle, behind the instrument board thereof where the same is secured, as at 52, to a rack gear 53, slidably mounted in a trough-like housing 54 secured to the back of the instrument board, see Figures 3 and 4. The housing 54 is also formed from a single sheet of metal to include the trough-like body thereof, a top turned-over flange 55 preventing up movement of the rack 53, and ears 56 adapted to carry the shaft and gear connections 57. The shaft 57 is projected through the instrument board and has secured thereupon a crank 58 whereby movement of the said shaft may be readily effected by the operator of the vehicle. The shaft 57 is threaded to receive the small spur gear 59, a jam nut 60 being provided to engage an extended sleeve portion of the gear to hold the same fixed to its position upon the shaft 57. By providing this threaded connection for the gear 59 compensation for varied thicknesses of instrument board may be readily made and a suitable dash plate 61 may be provided for being fixed to the front of the instrument board to make a neat appearance of the crank connection.

In passing from the spool bracket 29 to the housing 54, the operator rod 47 passes through the electric control housing 62 in the nature of a rectangular housing which is provided with suitable insulating bushings 63 at the points through which the said rod passes. The housing 62 has fixed within the same four spring contact elements 64—65, 66 and 67, see Figure 2 of the drawings. The contact springs are in electrical communication with the binding posts 68, 69, 70 and 71 respectively, suitable insulating bushings 72 being provided for insulating the said binding posts and spring contacts from the said housing.

Figure 5:
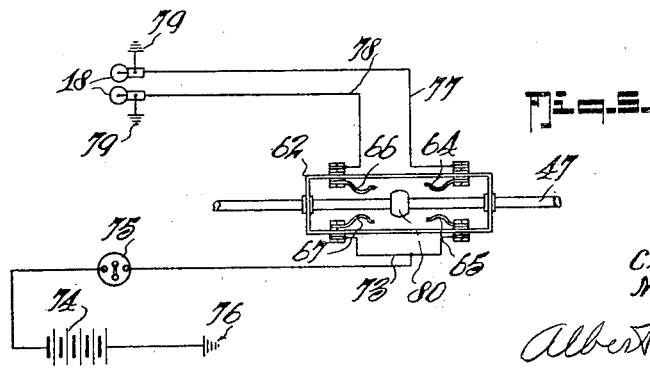
Figure 5 is a diagrammatic view illustrating the electric control mechanism and the electric circuit wiring.

The lower binding posts 69 and 71 are connected by the line wire 73 which is in turn connected by a suitable electric conducting wire to the source of energy or motor vehicle battery indicated at 74. A suitable switch 75 may be spliced in the connection just stated so that the electric energy may be cut out when desired as, for example, when the invention is being used in day light, and the battery connection 74 is suitably grounded, as at 76. The upper binding posts 68 and 70 are in communication, through the respective wiring connections 77—78, with the socket plugs 33 and the lamps 18 with which they are connected, the said lamps being suitably grounded, as indicated at 79, see Figures 2 and 5.

Figure 2:
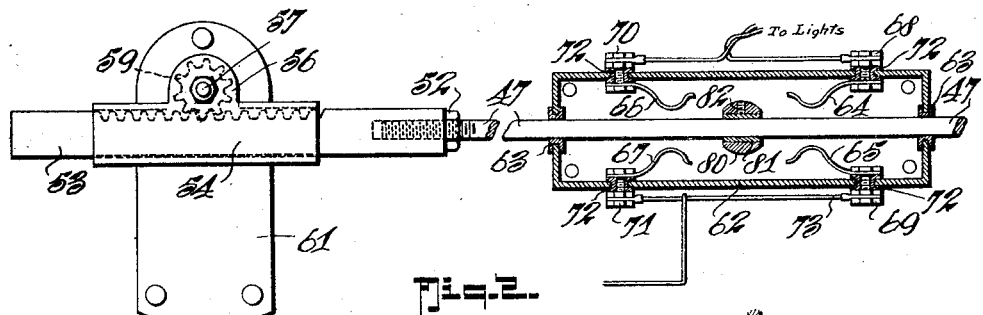
Figure 2 is a rear view of the control mechanisms, the mechanical portion thereof being shown in rear elevation and the electrical part thereof in central section.

An olive shaped contact making element 80 is secured upon the operating rod 47 within the housing 62 in a manner for being positioned centrally thereof when the parts are in the normal inactive position illustrated in Figures 1 and 2 of the drawings. This element 80 includes an insulating bushing 81 and a suitable securing screw 82 which passes through a portion of the element and engages the bushing 81 in a manner for forcing the same aganist the rod to secure the position of said element.

Assuming the parts to be in the normal, inactive position illustrated in Figure 1 of the drawings, should the operator move the crank 58 to the left, he will effect a moving of the operating rod to the left also. This longitudinal movement of the operating rod toward the left will effect a rocking of the operating arm 40 downwardly from its central position illustrated in full lines in Figure 6 of the drawings, toward the lower dot and dash position of the same and for effecting a movement of the direction indicating member 35 to project the same and indicate a proposed turn of the vehicle toward the right. The opposite movement of the crank 58 will, of course, effect the opposite movement of the arm 40, indicated by the upper dotted position thereof, indicated in the said Figure 6, and such as will effect a projection of the upper direction indicating element 34 for indicating a proposed left turn of the vehicle.

When the invention is being used in the night time, or on a dark day, or even in the day time, if it be desired, the switch 75 will be closed so as to supply energy to the spring contacts 65 and 67. With the parts thus positioned, the first stated movement of the crank, that is, toward the left, would cause the contact maker 80 to connect the spring contacts 67 with the spring contact 65, thereby causing electric energy to flow through the last stated contact, and the wire connection 78 and through the lowermost indicating rod 28 to its ground connection 79 to effect a suitable lighting of the same. The second movement of the crank, that is, to the right, and which would effect a longitudinal movement of the rod 47 to the right, would cause the element 80 to bridge the contacts 65 and 64 causing electric energy to flow through the said element, the contact 64, the wire connection 79, and through the uppermost indicating light 28 to ground for effecting a lighting thereof.

Thus it will be seen that when the switch 75 is suitably positioned, the movement of the parts, such as will effect mechanical movement of one or the other of the indicating arrows 34 or 35, will effect a corresponding lighting of the respective light 28 which will act in cooperation with the display of the marking of that indicating element by exhibiting the indicating marking through the respective portion of the windows 6. It will also be observed that the indicating elements further cooperate with the lights by reason of the peculiar arrangement of the operating devices in that they will be projected to display the direction indications thereof, as far as they may be seen, and also to open the passage 22 through the wall 12 to make it possible to view the light 28 through either side of the device when that particular set of cooperating indicating elements are in active relation.

A spring finger 83 may be secured to each of the stop forming portions 8 bent from the partition wall 12, the said spring elements being so shaped and positioned as to hook over the guides 36 of the arrows 34 and 35 to tightly hold the same to position when they are retracted, thus ensuring the cooperative relation thereof with the roller arm and also tending to prevent rattling of the parts.

From the foregoing description, taken in connection with the accompanying drawings, it is thought the complete construction, operation and advantages of my invention will be readily understood by those skilled in the art to which it relates.

What we claim is:

1. A device of the class described comprising, a housing adapted to be mounted at the side of a motor vehicle in position to be viewed before and behind and having slotways therein, direction indicating members mounted to be projected and retracted through the slotways, mechanism operable from the instrument board of the vehicle for projecting and retracting the indicating members each independently of the other, and spring held devices for closing the slotways when the indicating members are retracted.

2. A device of the class described comprising, a housing adapted to be mounted at the side of a motor vehicle in position to be viewed before and behind and having slotways therein, direction indicating members mounted to be projected and retracted through the slotways, mechanism operable from the instrument board of the vehicle for projecting and retracting the indicating members each independently of the other, and fingers spring hinge connected to the housing each at a point above a slotway to yieldably close the same.

3. A device of the class described comprising, a housing adapted to be mounted at the side of a motor vehicle in position to be viewed before and behind and having slotways therein, direction indicating members mounted to be projected and retracted through the slotways, a single operating arm adapted to move the indicating members selectively by arcuate movement, and mechanism operable from the instrument board of the vehicle for moving the arm.

4. A device of the class described comprising, a housing adapted to be mounted at the side of a motor vehicle in position to be viewed before and behind and having slotways therein, direction indicating members mounted to be projected and retracted through the slotways, a single operating arm adapted to move the indicating members selectively by arcuate movement, the said arm having an anti-friction roller, a guide member carried by each indicating member and adapted to be engaged by the said roller, and mechanism operable from the instrument board of the vehicle for moving the same.

5. A device of the class described comprising, a housing adapted to be mounted at the side of a motor vehicle in position to be viewed before and behind and having slotways therein, direction indicating members mounted to be projected and retracted through the slotways, a single operating arm adapted to move the indicating members selectively by arcuate movement, the said arm having an anti-friction roller, a guide member carried by each indicating member and adapted to be engaged by the said roller, each said guide member having an extension for forming a start guide, a guide plate portion for guiding the roller when out of the influence of the guide members, and mechanism operable from the instrument board of the vehicle for moving the arm.

6. A device of the class described comprising, a housing adapted to be mounted at the side of a motor vehicle in position to be viewed before and behind and having slotways therein, direction indicating members mounted to be projected and retracted through the slotways, a single operating arm adapted to move the indicating members selectively by arcuate movement, the said arm having an anti-friction roller, a guide member carried by each indicating member and adapted to be engaged by the said roller, each said guide member having an extension for forming a start guide, a guide plate portion for guiding the roller when out of the influence of the guide members, stop lugs for being engaged by the rollers to limit the outward movement of the indicating members, spring clips for tightly holding the indicating members at their normally retracted positions, and mechanism operable from the instrument board of the vehicle for moving the arm.

7. A device of the class described comprising, a housing adapted to be mounted at the side of a motor vehicle in position to be viewed before and behind and having slotways therein, direction indicating members mounted to be projected and retracted through the slotways, a single operating arm adapted to move the indicating members selectively by arcuate movement, the said arm having an anti-friction roller, a guide member carried by each indicating member and adapted to be engaged by the said roller, a partition member for dividing the housing into front and rear compartments, the partition member being stamped from a single sheet of metal to include feet for being secured to the housing, guides for the indicating members, stops for the indicating members, stops adapted to be engaged by the roller, and a guide plate portion for guiding the roller when out of influence of the guide members, and mechanism operable from the instrument board of the vehicle for moving the same.

8. A device of the class described comprising, an open rectangular housing adapted to be mounted at the side of a motor vehicle in position to be viewed before and behind and having slotways therein, windowed end covers for the housing the glasses forming the windows thereof being distinctively marked to indicate directions, direction indicating members mounted to be projected and retracted through the slotways and distinctively marked to be associated with the markings of the windows, illuminating members within the housing and associated with the windows and the indicating members, and mechanism operable from the instrument board of the vehicle, for projecting and retracting the indicating members.

9. A device of the class described comprising, an open rectangular housing adapted to be mounted at the side of a motor vehicle in position to be viewed before and behind and having slotways therein, windowed end covers for the housing the glasses forming the windows thereof being distinctively marked to indicate directions, direction indicating members mounted to be projected and retracted through the slotways and distinctively marked to be associated with the markings of the windows, illuminating members within the housing and associated with the windows and the indicating members, mechanism operable from the instrument board of the vehicle for projecting and retracting the indicating members, and fingers spring-hinge connected to the housing each at a point above a slotway to yieldably close the same.

10. A device of the class described comprising, an open rectangular housing adapted to be mounted at the side of a motor vehicle in position to be viewed before and behind and having slotways therein, windowed end covers for the housing, the glasses forming the windows thereof being distinctively marked to indicate directions, direction indicating members mounted to be projected and retracted through the slotways and distinctively marked to be associated with the markings of the windows, illuminating members within the housing and associated with the windows and the indicating members, a single operating arm adapted to move the indicating members selectively by arcuate movement, the said arm having an anti-friction roller, a guide member carried by each indicating member and adapted to be engaged by the said roller, and mechanism operable from the instrument board of the vehicle for moving the arm.

11. A device of the class described comprising, an open rectangular housing adapted to be mounted at the side of a motor vehicle in position to be viewed before and behind and having slotways therein, windowed end covers for the housing the glasses forming the windows thereof being distinctively marked to indicate directions, direction indicating members mounted to be projected and retracted through the slotways and distinctively marked to be associated with the markings of the windows, illuminating members within the housing and associated with the windows and the indicating members, mechanism operable from the instrument board of the vehicle for projecting and retracting the indicating members, a partition member for dividing the housing into front and rear compartments, the partition member being stamped from a single sheet of metal to include feet for being secured to the housing, guides for the indicating members, stops for the indicating members, stops adapted to be engaged by the roller, openings through which the light from the illuminating members may be viewed from the front when the respective indicating member has been projected, and a guide plate portion for guiding the roller when out of influence of the guide members.

12. A device of the class described comprising, an open rectangular housing adapted to be mounted at the side of a motor vehicle in position to be viewed before and behind and having slotways therein, windowed end covers for the housing the glasses forming the windows thereof being distinctively marked to indicate directions, direction indicating members mounted to be projected and retracted through the slotways and distinctively marked to be associated with the markings of the windows, illuminating members within the housing and associated with the windows and the indicating members, mechanism operable from the instrument board of the vehicle for projecting and retracting the indicating members, light baffles preventing confusion of the illuminating members and window cooperation, the said baffles including beads carrying shock absorbing elements for engaging the windows.

13. A device of the class described comprising, an open rectangular housing adapted to be mounted at the side of a motor vehicle in position to be viewed before and behind and having slotways therein, windowed end covers for the housing, the glasses forming the windows thereof being distinctively marked to indicate directions, direction indicating members mounted to be projected and retracted through the slotways and distinctively marked to be associated with the markings of the windows, illuminating members within the housing and associated with the windows and the indicating members, a single operating arm adapted to move the indicating members selectively by arcuate movement, the said arm having an anti-friction roller, a guide member carried by each indicating member and adapted to be engaged by the said roller, mechanism operable from the instrument board of the vehicle for moving the arm, light baffles preventing confusion of the illuminating member and window cooperation, the said baffles including beads carrying shock absorbing elements for engaging the windows.

14. A device of the class described comprising, an open rectangular housing adapted to be mounted at the side of a motor vehicle in position to be viewed before and behind and having slotways therein, windowed end covers for the housing, the glasses forming the windows thereof being distinctively marked to indicate directions, direction indicating members mounted to be projected and retracted through the slotways and distinctively marked to be associated with the markings of the windows, illuminating members within the housing and associated with the windows and the indicating members, mechanism operable from the instrument board of the vehicle for projecting and retracting the indicating members, a partition member for dividing the housing into front and rear compartments, the partition member being stamped from a single sheet of metal to include feet for being secured to the housing, guides for the indicating members, stops for the indicating members, stops adapted to be engaged by the roller, openings through which the light from the illuminating members may be viewed from the front when the respective indicating member has been projected, a guide plate portion for guiding the roller when out of influence of the guide members, and light baffles preventing confusion of the illuminating member and window cooperation, the said baffles including beads carrying shock absorbing elements for engaging the windows.

15. A device of the class described comprising, a housing adapted to be mounted at the side of a motor vehicle in position to be viewed before and behind and having slotways therein, direction indicating members mounted to be projected and retracted through the slotways, a single operating arm adapted to move the indicating members selectively by arcuate movement, the said arm having an anti-friction roller, a guide member carried by each indicating member and adapted to be engaged by the said roller, mechanism operable from the instrument board of the vehicle for moving the same, and spring clips, one for engaging each guide member when the respective indicating member is at its normal retracted position to hold the same from rattling and in position for properly receiving the roller.

16. A device of the class described comprising, an open rectangular housing adapted to be mounted at the side of a motor vehicle in position to be viewed before and behind having slotways therein, windowed end covers for the housing the glasses forming the windows thereof being distinctively marked to indicate directions, direction indicating members mounted to be projected and retracted through the slotways and distinctively marked to be associated with the markings of the windows, illuminating members within the housing and associated with the windows and the indicating members, mechanism operable from the instrument board of the vehicle for projecting and retracting the indicating members and light baffles preventing confusion of the illuminating member and window cooperation, the said baffles including beads carrying shock absorbing elements for engaging the windows, and being positioned in opposition to each other to form a housing for a part of the projecting and retracting mechanism.

17. A device of the class described comprising, an open rectangular housing adapted to be mounted at the side of a motor vehicle in position to be viewed before and behind and having slotways therein, windowed end covers for the housing the glasses forming the windows thereof being distinctively marked to indicate directions, direction indicating members mounted to be projected and retracted through the slotways and distinctively marked to be associated with the markings of the windows, illuminating members within the housing and associated with the windows and the indicating members, a single operating arm adapted to move the indicating members selectively by arcuate movement, the said arm having an anti-friction roller, a guide member carried by each indicating member and adapted to be engaged by the said roller, mechanism operable from the instrument board of the vehicle for moving the arm, the said mechanism including a longitudinally movable rod, crank gear and rack connections housed behind the automobile instrument board, the rack being secured to the rod, and gear and rack connections housed within the indicator housing, the gear thereof being secured to the operating arm and the rack thereof being secured to the rod.

18. A device of the class described comprising, an open rectangular housing adapted to be mounted at the side of a motor vehicle in position to be viewed before and behind and having slotways therein, windowed end covers for the housing the glasses forming the windows thereof being distinctively marked to indicate directions, direction indicating members mounted to be projected and retracted through the slotways and distinctively marked to be associated with the markings of the windows, illuminating members within the housing and associated with the windows and the indicating members, a single operating arm adapted to move the indicating members selectively by arcuate movement, the said arm having an anti-friction roller, a guide member carried by each indicating member and adapted to be engaged by the said roller, mechanism operable from the instrument board of the vehicle for moving the arm, a housing for the gear and rack connections housed within the indicator housing and being formed from a single sheet of metal, and a similar housing for the crank gear and rack connections to house the same behind the automobile instrument board the said housing being secured to the rear of that board.

CHESTER M. DOWERS.
MARION R. LOGAN.